(12) United States Patent
Abe

(10) Patent No.: US 10,466,389 B2
(45) Date of Patent: Nov. 5, 2019

(54) OPTICAL ELEMENT, MANUFACTURING METHOD THEREOF, AND OPTICAL APPARATUS

(71) Applicant: CANON KABUSHIKI KAISHA, Tokyo (JP)

(72) Inventor: Keiko Abe, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 15/901,727

(22) Filed: Feb. 21, 2018

(65) Prior Publication Data
US 2018/0246256 A1 Aug. 30, 2018

(30) Foreign Application Priority Data
Feb. 27, 2017 (JP) .................. 2017-034272

(51) Int. Cl.
G02B 26/00 (2006.01)
G02B 1/11 (2015.01)
B29D 11/00 (2006.01)
G02B 1/118 (2015.01)
G02B 27/00 (2006.01)

(52) U.S. Cl.
CPC .............. G02B 1/11 (2013.01); B29D 11/00 (2013.01); B29D 11/00884 (2013.01); G02B 1/118 (2013.01); G02B 27/0018 (2013.01); B29D 11/00009 (2013.01); B29D 11/00432 (2013.01)

(58) Field of Classification Search
CPC ........ G02B 1/14; G02B 27/0018; G02B 1/11; G02B 1/113; G02B 1/118; G02B 1/111; G02B 1/04; G02F 1/133502

USPC .................. 359/601, 428; 428/143
See application file for complete search history.

(56) References Cited

U.S. PATENT DOCUMENTS

| 6,770,352 B2* | 8/2004 | Suzuki .................. B05D 3/067 264/494 |
| 2011/0176216 A1* | 7/2011 | Kawauchi ........ B29D 11/00903 359/614 |
| 2013/0016430 A1* | 1/2013 | Ogawa .................. G02B 1/105 359/614 |
| 2014/0044919 A1* | 2/2014 | Makino .................. G02B 1/115 428/141 |

FOREIGN PATENT DOCUMENTS

| JP | 2005275372 A | 10/2005 |
| JP | 2006259711 A | 9/2006 |
| JP | 2015176016 A | 10/2015 |

* cited by examiner

*Primary Examiner* — William R Alexander
*Assistant Examiner* — Tamara Y. Washington
(74) *Attorney, Agent, or Firm* — Canon U.S.A., Inc. IP Division

(57) ABSTRACT

An optical element is provided that includes a base having a smooth surface and a rough surface on one surface thereof, an antireflection film having an irregularity structure on a surface of the antireflection film over the smooth surface of the base, and a light shielding film over the rough surface, wherein the irregularity structure of the antireflection film has an average height of 50 nm or less in an overlapping portion, in which an edge portion of the antireflection film and an edge portion of the light shielding film overlap each other over the smooth surface.

6 Claims, 2 Drawing Sheets

OPTICAL ELEMENT, MANUFACTURING METHOD THEREOF, AND OPTICAL APPARATUS

BACKGROUND

Field of the Disclosure

The present disclosure relates to an optical element for use in an optical apparatus such as a camera, a manufacturing method thereof, and an optical apparatus including the optical element.

Description of the Related Art

An optical element, such as a lens or a prism, for use in an optical system of an optical apparatus, such as a camera or a projector, uses therein an antireflection portion for preventing unwanted light other than focused light flux from being incident upon the image plane. Typical examples of such unwanted light include reflected light from a light input/output surface of the optical element, and reflected light from the circumferential edge portion of an end face of the optical element. These types of unwanted light may cause flare and/or ghost. To avoid such unwanted light, the following techniques have conventionally been used.

Technique 1: An antireflection portion for increasing the transmittance of incident light to reduce the reflectance is formed in the light active portion, thereby preventing unwanted light from being generated.

Technique 2: An antireflection portion for increasing the absorptance of light to reduce the reflectance is formed in the circumferential edge portion, which is a light inactive portion, thereby preventing unwanted light from being generated.

A common conventional method for Technique 1 is to form an antireflection film that is a multilayer stack of dielectric thin films, generally called "multicoat." Another known method is to form a film of boehmite, which is a hydroxyoxide of aluminum, on a substrate to provide an antireflection effect. In the latter case, an antireflection film is formed as follows. A film is formed using a vacuum deposition method or using a liquid phase method (sol-gel method). Next, drying or baking is performed to obtain an aluminum oxide film, which is then treated by water vapor, or immersed in warm water, to transform the surface layer into a boehmite film. Thus, an irregularity structure having a dimension at the lower limit of, or below, the used wavelength range is formed to produce an antireflection film.

A common conventional method for Technique 2 is to form a light shielding film in the circumferential edge portion. To improve the light shielding capability by scattering and to improve the adhesion property of the light shielding film, the circumferential edge portion is formed to be a rough surface having an arithmetic mean roughness Ra in a range from about 1 μm to about 50 μm. In addition, because of the practical difficulty of completely aligning an end of the light shielding film formed on the rough surface with an end of the rough surface, the light shielding film is formed to allow the edge portion thereof to partly overlap a smooth surface.

If a gap covered with no film exists between the antireflection film and the light shielding film in a boundary portion between the light active portion of Technique 1 and the light inactive portion of Technique 2, strong unwanted light may be generated. To avoid such situation, the antireflection film and the light shielding film are formed to partly overlap each other. Considering a fact that a smaller refractive index difference between the antireflection film and the substrate of the optical element can reduce reflection at a higher degree, the antireflection film and the light shielding film are generally formed such that the antireflection film is formed on the substrate, and the light shielding film is formed on the antireflection film.

In recent years, for improving performance of an antireflection film, a method has been increasingly used in which, rather than the multicoat antireflection film described above, an antireflection film having an irregularity structure having a dimension at the lower limit of, or below, the used wavelength range is formed. Japanese Patent Laid-Open No. 2015-176016 discloses a configuration including an antireflection film having an irregularity structure, as an antireflection portion for a light active portion, on a surface of the antireflection film, and a light shielding film formed in a light inactive portion around the light active portion, wherein an edge portion of the light shielding film extends to the light active portion to overlap an edge portion of the antireflection film.

If, as described above, an optical element is configured such that an edge portion of the antireflection film having an irregularity structure and an edge portion of the light shielding film overlap each other, and this overlapping portion resides over the smooth surface, film blister and/or film peeling (hereinafter referred to collectively as "film blister/peeling") is likely to occur at the interface between the antireflection film and the substrate. This presents a problem in that ghost and/or flare are caused in an optical apparatus including such optical element. Ghost and flare readily occur particularly in a harsh environment, such as a high temperature, a low temperature, and a high humidity, and may thus occur by aging during usage. Such blister/peeling of an antireflection film can be reduced or eliminated generally by improving the adhesion between the substrate and the antireflection film. However, an improvement in the adhesion between the substrate and the antireflection film will require a certain solution, such as changing the material of, or adding another material to, the antireflection film, and/or disposing an underlying layer formed of another material over the substrate. Such solutions are unfavorable in view of the adverse effect on the antireflection performance, and in view of an increase in the material cost and in the number of manufacturing steps.

SUMMARY

It is an aspect of the present disclosure to solve the problems described above, and thereby reduce or eliminate blister/peeling of an antireflection film in an optical element including an antireflection film having an irregularity structure and a light shielding film, formed such that edge portions of both films overlap each other on a smooth surface. It is another aspect of the present disclosure to reduce or eliminate ghost and flare in an optical apparatus by using such optical element.

A first aspect of the present disclosure is directed to an optical element including a base having, on at least one surface, a smooth surface and a rough surface surrounding an outer periphery of the smooth surface, an antireflection film continuously formed over the smooth surface and over a portion of the rough surface of the base, the antireflection film having an irregularity structure on a surface opposite the base, and a light shielding film continuously formed over at least the rough surface and a portion of the smooth surface to cover an outer peripheral edge portion of the antireflection film. The irregularity structure has an average height of 50 nm or less in a region where the antireflection film and the light shielding film overlap each other over the smooth surface.

Another aspect of the present disclosure is directed to a method for manufacturing the optical element according to the first aspect of the present disclosure, and the method sequentially includes: preparing a base having, on at least one surface, a smooth surface and a rough surface surrounding an outer periphery of the smooth surface, continuously forming, over the smooth surface and over a portion of the rough surface, an antireflection film having an irregularity structure on a surface of the antireflection film, applying a light shielding coating material on at least the rough surface and a portion of the smooth surface to cover an outer peripheral edge portion of the antireflection film, and bringing into contact an elastic member with the light shielding coating material applied on the antireflection film over the smooth surface to arrange for the irregularity structure to have an average height of 50 nm or less.

Yet another aspect of the present disclosure is directed to an optical apparatus including the optical element according to the first aspect of the present disclosure.

Further features of the present disclosure will become apparent from the following description of exemplary embodiments (with reference to the attached drawings).

DESCRIPTION OF THE EMBODIMENTS

Figure 1:
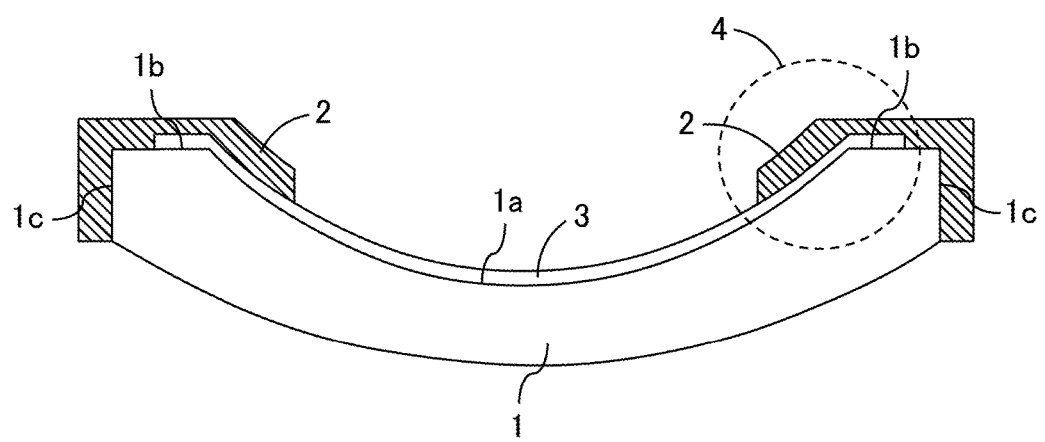
FIG. 1 is a cross-sectional view schematically illustrating a configuration of an optical element, according to one embodiment of the present disclosure.

An exemplary embodiment of the present disclosure will be described in detail below with reference to the drawings. It is understood that the present disclosure is not limited to the specific embodiment disclosed. Note that elements or features other than those specifically described in the description below or other than those specifically illustrated in the drawings may be implemented using any known technique in the art.

Figure 2:
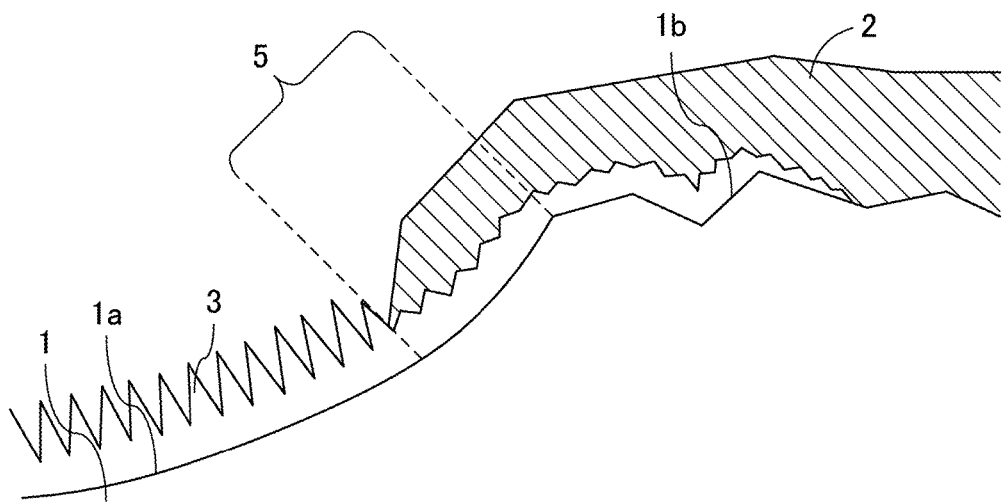
FIG. 2 is an enlarged view of a portion of the optical element illustrated in FIG. 1, according to one embodiment of the present disclosure.

FIG. 1 is a cross-sectional view schematically illustrating an optical element according to one embodiment of the present disclosure. FIG. 2 is an enlarged view of a portion 4 of FIG. 1.

As illustrated in FIG. 1, the optical element according to the embodiment of the present disclosure includes a lens substrate 1 having, on one surface of the lens substrate (base) 1, a smooth surface 1a and a rough surface 1b surrounding an outer periphery of the smooth surface 1a. The smooth surface 1a is a light active portion, while the rough surface 1b is a circumferential edge portion, and is a light inactive portion. The optical element according to the embodiment of FIG. 1 has a circular shape when viewed from above. In the present disclosure, an antireflection film 3 is continuously formed over the smooth surface 1a and over a portion of the rough surface 1b. As illustrated in FIG. 2, the antireflection film 3 has an irregularity structure on a surface opposite the lens substrate 1. The antireflection film 3 may further include a portion for supporting the irregularity structure between the irregularity structure and the lens substrate 1. The antireflection film 3 may still further include, between the irregularity structure and the lens substrate 1, or between the portion for supporting the irregularity structure and the lens substrate 1, one or more layers formed of a material different from the material forming the irregularity structure, or different from the material forming the portion for supporting the irregularity structure. A light shielding film 2 is continuously formed over the rough surface 1b and over a portion of the smooth surface 1a, and an edge portion of the light shielding film 2 covers an outer peripheral edge portion of the antireflection film 3. Thus, an edge portion of the antireflection film 3 and an edge portion of the light shielding film 2 overlap each other on the smooth surface. In this embodiment, the side surface of the lens substrate 1 is also a rough surface (rough surface 1c in FIG. 1), and forming the light shielding film 2 to also cover the rough surface 1c reduces or eliminates occurrence of unwanted light at the side surface of the lens substrate 1.

FIG. 2 illustrates a portion where the light shielding film 2 overlaps a portion of the antireflection film 3 having irregularities on one surface of the antireflection film 3, over the smooth surface 1a of the lens substrate 1. As used herein, this portion (i.e., the region where the antireflection film 3 and the light shielding film 2 overlap each other over the smooth surface 1a) is referred to as "overlapping portion 5." The antireflection film 3 readily undergoes film blister/peeling at the interface with the lens substrate 1 in this overlapping portion 5. To investigate the underlying mechanism of this, the present inventor has focused on the difference between the contact area of the antireflection film 3 with the light shielding film 2 and the contact area of the antireflection film 3 with the lens substrate 1. Specifically, since the antireflection film 3 has the irregularity structure at the boundary with the light shielding film 2, the contact area at this boundary is extremely greater than the contact area of the antireflection film 3 with the lens substrate 1. It has been found that this configuration causes a high tensile stress of the light shielding film 2, and thus generates a peeling force at the bottom of the antireflection film 3, thereby causing film blister/peeling. Note that the contact area of the antireflection film 3 with the lens substrate 1 is greater over the rough surface 1b, due to the roughness thereof, than over the smooth surface 1a. Accordingly, in the region over the rough surface 1b, the difference between the contact area of the antireflection film 3 with the lens substrate 1 and the contact area of the antireflection film 3 with the light shielding film 2 is less than the difference therebetween in the region over the smooth surface 1a. Thus, the antireflection film 3 is less likely to undergo film blister/peeling in a region over the rough surface 1b.

The present inventor has found that a reduction of the contact area of the irregularity structure of the antireflection film 3 with the light shielding film 2 relative to the contact area of the antireflection film 3 with the lens substrate 1 can reduce or eliminate film blister/peeling of the antireflection film 3. Specifically, an average height of the irregularity structure portion of the antireflection film 3 of 50 nm or less can reduce the contact area of the irregularity structure of the antireflection film 3 with the light shielding film 2 relative to the contact area of the antireflection film 3 with the lens substrate 1. The height of the entire antireflection film 3 (total film thickness of the antireflection film 3) including the irregularity structure is not particularly limited if the average height of the irregularity structure portion is 50 nm or less. Thus, an average height of the irregularity structure portion of 50 nm or less can further reduce or eliminate film blister/peeling at the interface between the antireflection film 3 and the lens substrate 1. In addition, an average height of the irregularity structure portion of 10 nm or more can reduce or eliminate film blister/peeling at the interface between the antireflection film 3 and the light shielding film 2.

The optical element according to the present disclosure can be manufactured, in the order described below, by forming the antireflection film 3 over the lens substrate 1, applying a light shielding coating material so as to cover the outer peripheral edge portion of the antireflection film 3, and bringing into contact an elastic member with the light shielding coating material, and curing the light shielding coating material, to form the light shielding film 2. The members and the process of forming the members according to the present disclosure will now be described.

Examples of the material of the lens substrate 1 include glass and a glass mirror. Examples of the glass material include an alkali-containing glass, an alkali-free glass, an alumina silicate glass, a borosilicate glass, a barium-based glass, a lanthanum-based glass, a titanium-based glass, and a fluorine-based glass. Although FIG. 1 illustrates the lens substrate 1 as a concave meniscus lens, the lens substrate of the present disclosure is not limited thereto. For example, an optical member having a shape of other lens, such as a concavo-concave lens, a plano-concave lens, an aspherical lens, or a lens having a free-form surface may also be used.

The irregularity structure, and the portion for supporting the fine structure and the irregularity structure, of the antireflection film 3 according to the present disclosure, are produced by immersing the aluminum-containing film in warm water to allow the surface of the film to be dissolved and redeposited. The resultant film is a crystalline planar film having an irregularity structure on a surface of the film. Specifically, for example, the method described in Japanese Patent Laid-Open No. 2006-259711, Japanese Patent Laid-Open No. 2005-275372, or the like may be used. The aluminum-containing film described above may be a film mainly containing an aluminum oxide formed by a sol-gel method or other method, or may be a film formed of metallic aluminum, or of an alloy or oxide containing aluminum metal, using a vapor phase method, such as a known chemical vapor deposition (CVD), vapor deposition, or physical vapor deposition (PVD) method (e.g., sputtering).

The material for forming the antireflection film 3 may also be one of zirconium, silicon, titanium, and zinc compounds, or a mixture containing at least one of these compounds and an aluminum compound. The oxides (i.e., zirconia, silica, titania, zinc oxide, and alumina) among these compounds may also be formed using a metal alkoxide, a chloride, or a salt compound such as a nitrate, of these compounds. In particular, zirconia, silica, and titania are preferably formed using a metal alkoxide in view of film formability.

The light shielding film 2 according to the present disclosure is opaque in the used wavelength range, and can be formed using a light shielding coating material formulated from a black dye, dyes and pigments of various colors, opaque particles, a resin, and/or a similar material.

The light shielding film 2 is formed by applying, drying, and curing a light shielding coating material that is opaque in the used wavelength range. The application method is appropriately selected from brush application, inkjet application, jet dispensing, die coating, and other similar techniques. A thermal process is preferred for the drying/curing method, but any other method may also be used if a similar light shielding film is provided.

The light shielding film 2 having a film thickness of 3 µm or more has a sufficient light shielding effect, allowing ghost and flare to be successfully reduced or eliminated, and the light shielding film 2 having a film thickness of 50 µm or less is unlikely to suffer from crack formation. Thus, the light shielding film 2 preferably has a film thickness in a range from 3 µm to 50 µm. The edge portion of the light shielding film 2 over the smooth surface 1a preferably has a steep rise in shape along the thickness direction. Specifically, it is preferred that the film thickness increases to 3 µm within 50 µm from the edge of the light shielding film 2.

Figure 3:
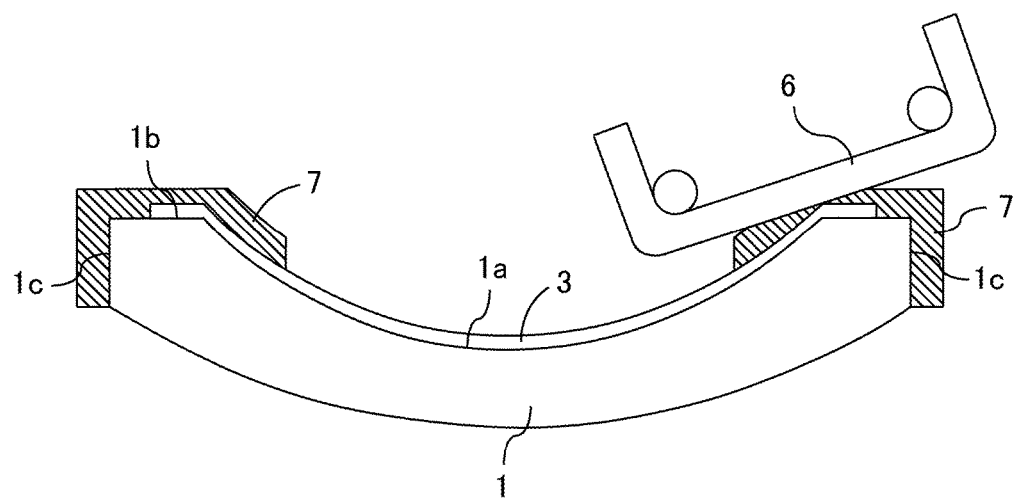
FIG. 3 is a cross-sectional view schematically illustrating a process of forming a light shielding film of the optical element of FIG. 1, according to one embodiment of the present disclosure.

In the present disclosure, the irregularity structure in the overlapping portion 5, where the antireflection film 3 overlap the light shielding film 2 over the smooth surface 1a, is formed to have an average height of 50 nm or less by, for example, intentionally damaging the irregularity structure already formed, of the antireflection film 3, during formation of the light shielding film 2. Specifically, as illustrated in FIG. 3, a light shielding coating material 7 is applied on the outer peripheral edge portion of the antireflection film 3 and on the rough surface 1b, and if necessary, also on the rough surface 1c. Then, an elastic member 6 is brought into contact with the light shielding coating material 7 in the overlapping portion 5 illustrated in FIG. 2 to allow the elastic member 6 to press the light shielding coating material 7 against the irregularity structure. This process damages the irregularity structure on the surface of the antireflection film 3, thereby reducing the average height to 50 nm or less. Thereafter, the light shielding coating material 7 is cured to form the light shielding film 2.

The elastic member 6 may be either an elastic string or an elastic blade. If an elastic string is used, the elastic string needs to be supported by at least two supports to apply a tensional force. The elastic string is then allowed to act on the lens using a portion between these two supports. If an elastic blade is used, the elastic blade may be used alone, or may be used with a spring or a moving stage connected to the elastic blade. The material of the elastic member 6 is not particularly limited as long as the elastic member 6 can exert a pressing force of an intensity in a desired range on the antireflection film 3. The material of the elastic member 6 may be, for example, a resin such as Teflon® or a nylon, or a metal such as aluminum, copper, steel, or tungsten. An elastic string can be placed by keeping tension between the two supports, and can thus be implemented in a relatively simple configuration of the apparatus.

When the process of pressing the light shielding coating material 7 has proceeded to the edge portion of the smooth surface 1a in the manner described above, spread of the light shielding coating material 7 resulted from pressing by the elastic member 6 causes the light shielding film 2 to be also formed on a portion not pressed by the elastic member 6. However, the area of the edge portion of the lens substrate 1 over which the elastic member 6 exerts a pressing force in this manner can be controlled by adjusting conditions such as the material and the shape of the elastic member 6, and the pressing force exerted by the elastic member 6. In addition, the area of the portion where the elastic member 6 has not pressed during pressing of the light shielding coating material 7 (the remaining portion of the irregularity structure) is very small as compared to the area of the portion pressed by the elastic member 6. Therefore, stress of the light shielding film 2 that will cause film blister/peeling is unlikely to occur.

The film thickness of the antireflection film 3 and the average height of the irregularity structure of the antireflection film 3 in the region where the antireflection film 3 and the light shielding film 2 overlap each other over the smooth surface 1a of the optical element can be determined by observation of a cross section of the optical element. Specifically, the film thickness and the average height described above are determined by observation of a cross-sectional image obtained using one of scanning electron microscopy (SEM), scanning transmission electron microscopy (STEM), and transmission electron microscopy (TEM) after a focused ion beam (FIB) process. The process steps are as follows.

Step 1: From the image obtained by SEM, STEM, or TEM, a suitable portion is selected to generate an observation image that includes the lens substrate 1, a lower portion (the portion for supporting the irregularity structure) of the antireflection film 3, an upper portion (the irregularity structure) of the antireflection film 3, and the light shielding film 2, sequentially arranged in this order from left to right.

Step 2: Using an image processing program (ImageJ), the brightness value is averaged along the vertical direction in the observation image, and the averaged brightness value is plotted on the vertical axis against the length (film thickness) on the horizontal axis to draw a graph.

Step 3: Comparing the observation image with the graph, the total film thickness of the antireflection film 3 including the irregularity structure, and the average height of the irregularity structure at the observation location are calculated.

Note that film blister/peeling that has occurred at the interface between the antireflection film 3 and the lens substrate 1 is also detectable in the observation image.

An observation is made in five cross sections at different locations where the antireflection film 3 and the light shielding film 2 overlap each other over the smooth surface 1a by repeating Steps 1 to 3 described above. The average value of the observation results is herein defined as the average height of the irregularity structure in the region where the antireflection film and the light shielding film overlap each other over the smooth surface. The optical element according to the present disclosure may further include, in addition to the members described above, one or more films for implementing various functions. For example, the antireflection film 3 may further include one or more layers of films between the lens substrate 1 and the irregularity structure, and/or between the lens substrate 1 and the portion for supporting the irregularity structure, to further improve antireflection property.

In this embodiment, the average height of 50 nm or less in the portion of the irregularity structure of the antireflection film overlapping the light shielding film over the smooth surface provides a reduced difference between the contact area of the light shielding film with the antireflection film and the contact area of the antireflection film with the smooth surface. This configuration reduces or eliminates film blister/peeling at the interface between the antireflection film and the smooth surface due to tensile stress of the light shielding film. Thus, an optical apparatus including the optical element according to the present disclosure can reduce or eliminate occurrence of ghost and flare caused by such film blister/peeling. The optical element according to the present disclosure is applicable to an optical apparatus such as a camera, a pair of binoculars, a microscope, and a semiconductor exposure apparatus. Specifically, the light shielding film of the optical element of the present disclosure can be placed in contact with a holder of an optical apparatus to allow the optical element to be held in the optical apparatus, and thus an optical apparatus that reduces the occurrence of ghost and flare can be provided.

EXAMPLES

Example 1

A lens was used which was formed of "S-LaH53" (refractive index nd=1.8) manufactured by Ohara Inc., and had an outer diameter of 66 mm, an inner diameter of 34 mm, and rough surfaces 1b and 1c each having an arithmetic mean roughness Ra of 1 μm to 50 μm in the outer peripheral edge portion and in the side surface, as the lens substrate 1 having the shape illustrated in FIG. 1. This lens was ultrasonically cleaned in an alkaline cleaning solution, and was dried in an oven. Then, an appropriate amount of aluminum oxide precursor sol was dropped onto the lens to spin-coat the lens for 20 seconds at a rotational speed of 3000 rpm. Thereafter, the outer peripheral edge portion of the rough surface 1c was wiped with a sponge (trade name: SOFRAS) soaked with 2-ethyl butanol solvent. The resultant product was then baked in a hot air-circulating oven at 140° C. for 30 minutes to form an amorphous aluminum oxide film, followed by immersion of the product in warm water at 75° C. for 20 minutes, to form the antireflection film 3 having an irregularity structure.

The light shielding film 2 was formed over the rough surfaces 1b and 1c and over a portion of the smooth surface 1a of the lens using the light shielding coating material described below.

The main ingredient of the light shielding coating material will first be described. A mixture of 42.9 g of propylene glycol monomethyl ether, a dispersant, and 14.3 g of fine particles of titania ("MT-05" manufactured by Tayca Corporation) having a refractive index (nd) of 2.2 or higher was dispersed using a bead mill ("Ultra Apex Mill" manufactured by Kotobuki Industries Co., Ltd.) and beads having a diameter of 50 μm. Each of 57.2 g of the resultant slurry containing the titania fine particles having a number average particle size of 20 nm, 21 g of an epoxy resin A, 1 g of a coupling agent, 13 g of a colorant, and 40 g of propylene glycol monomethyl ether was weighed out and introduced into a ball mill pot. Next, five magnetic balls each having a diameter of 20 mm were introduced into the ball mill pot, which was then installed in a roll coater, and the resultant mixture was stirred for 48 hours. Thus, the main ingredient of the light shielding coating material was obtained. The epoxy resin A used was a condensation polymer of 4,4'-isopropylidenediphenol and 1-chloro-2,3-epoxypropane ("Epikote 828" produced by Mitsubishi Chemical Corporation). The coupling agent used was an epoxy-based silane coupling agent ("KBM403" produced by Shin-Etsu Chemical Co., Ltd.). The colorant used was a mixture of black, red, yellow, and blue dyes. The black dye, the red dye, the yellow dye, and the blue dye were respectively "VALIFAST BLACK 1821," "VALIFAST RED 3320," a combination of "OIL YELLOW 129" and "VALIFAST YELLOW 3108," and "VALIFAST BLUE 1605" each produced by Orient Chemical Industries Co., Ltd.

Next, 1.9 g of an amine-based curing agent A and 1 g of a curing catalyst A were added to 132.2 g of the main ingredient of the light shielding coating material, and the mixture was then stirred by a roll coater for 30 minutes. The amine-based curing agent A used was an aliphatic amine-based curing agent, specifically "ADEKA HARDENER EH-6019" produced by Adeka Corporation. The curing catalyst A used was 2,4,6-tris(diaminomethyl)phenol. The resultant coating material was used as the light shielding coating material.

The light shielding coating material was applied on the rough surfaces 1b and 1c using a jet dispenser, and on a peripheral portion including the edge portion of the smooth surface 1a using an elastic string. The elastic string was a wire made of a nylon, and having a Young's modulus E of 3 GPa and a diameter of 330 μm.

Determination of Film Thickness of Antireflection Film and Average Height of Irregularity Structure At a location where an observation image was successfully obtained, located between 200 nm and 300 nm to the rough surface 1b from the edge of the light shielding film 2 over an edge portion of the smooth surface 1a of the optical element produced, the total film thickness of the antireflection film 3 and the average height of the irregularity structure portion were determined using a cross-sectional STEM image after an FIB process. The results indicated that the total film thickness of the antireflection film 3 was 141.8 nm, and the average height of the irregularity structure portion was 49.6 nm. The total film thickness of the portion of the antireflection film 3 where the light shielding film 2 does not overlap, over the smooth surface 1a, was 324 nm, and the film thickness of the light shielding film including the antireflection film 3 at the determination location was 1.2 μm.

In addition, another image was obtained that contains a location 50 μm to the rough surface 1b from the edge of the light shielding film 2 over the smooth surface 1a. An observation made of a cross-sectional STEM image after an FIB process indicated that the thickness of the light shielding film 2 at the location described above was 4.5 μm.

Examination for Film Blister/peeling

A reliability test of high temperature and high humidity was performed in which the optical element produced was subjected to conditions of a temperature of 60° C. and a relative humidity of 90% for 1000 hours. After this reliability test, an examination was made of the edge portion of the smooth surface 1a in a cross-sectional STEM image after an FIB process, and the examination confirmed that no film blister/peeling had occurred.

Example 2

An optical element was produced under conditions similar to those of Example 1 except that the rotational speed for spin coating of aluminum oxide precursor sol onto the lens was 4500 rpm, and determinations and calculations for the locations described above were made similarly to Example 1. A reliability test was also performed similarly to Example 1, and an examination of the edge portion of the smooth surface 1a confirmed that no film blister/peeling had occurred.

Example 3

An optical element was produced under conditions similar to those of Example 1 except that the rotational speed for spin coating of aluminum oxide precursor sol onto the lens was 2000 rpm, and determinations and calculations for the locations described above were made similarly to Example 1. A reliability test was also performed similarly to Example 1, and an examination of the edge portion of the smooth surface 1a confirmed that no film blister/peeling had occurred.

Example 4

An optical element was produced under conditions similar to those of Example 1 except that "GT-7" produced by Canon Chemicals Inc. was used as the light shielding coating material, and was applied to the rough surfaces 1b and 1c by brush application for application onto the lens. Then, determinations and calculations for the locations described above were made similarly to Example 1. A reliability test was also performed similarly to Example 1, and an examination of the edge portion of the smooth surface 1a confirmed that no film blister/peeling had occurred.

Example 5

An optical element was produced under conditions similar to those of Example 4 except that "GT-7 II" produced by Canon Chemicals Inc. was used as the light shielding coating material for the lens, and determinations and calculations for the locations described above were made similarly to Example 1. A reliability test was also performed similarly to Example 1, and an examination of the edge portion of the smooth surface 1a confirmed that no film blister/peeling had occurred.

Example 6

An optical element was produced under conditions similar to those of Example 4 except that "GT-1000" produced by Canon Chemicals Inc. was used as the light shielding coating material for the lens, and determinations and calculations for the locations described above were made similarly to Example 1. A reliability test was also performed similarly to Example 1, and an examination of the edge portion of the smooth surface 1a confirmed that no film blister/peeling had occurred.

Example 7

An optical element was produced under conditions similar to those of Example 4 except that "OK-602-C" produced by Ohashi Chemical Industries Ltd. was used as the light shielding coating material for the lens, and determinations and calculations for the locations described above were made similarly to Example 1. A reliability test was also performed similarly to Example 1, and an examination of the edge portion of the smooth surface 1a confirmed that no film blister/peeling had occurred.

Comparative Example 1

An optical element was produced under conditions similar to those of Example 1 except that the light shielding coating material was applied onto the lens only by brush application and no elastic member was used for application. Then, determinations and calculations for the locations described above were made similarly to Example 1. A reliability test was also performed similarly to Example 1, and an examination of the edge portion of the smooth surface 1a found film peeling.

Comparative Example 2

An optical element was produced under conditions similar to those of Comparative Example 1 except that the rotational speed for spin coating of aluminum oxide precursor sol onto the lens was 2500 rpm, and determinations and calculations for the locations described above were made similarly to Example 1. A reliability test was also performed similarly to Example 1, and an examination of the edge portion of the smooth surface 1a found film peeling.

Comparative Example 3

An optical element was produced under conditions similar to those of Comparative Example 1 except that the rotational speed for spin coating of aluminum oxide precursor sol onto the lens was 4500 rpm, and determinations and calculations for the locations described above were made similarly to Example 1. A reliability test was also performed similarly to Example 1, and an examination of the edge portion of the smooth surface 1a found film peeling.

Comparative Example 4

An optical element was produced under conditions similar to those of Comparative Example 1 except that "GT-7 II" produced by Canon Chemicals Inc. was used as the light shielding coating material for the lens, and determinations and calculations for the locations described above were made similarly to Example 1. A reliability test was also performed similarly to Example 1, and an examination of the edge portion of the smooth surface 1a found film peeling.

The results of Examples 1 to 7 and Comparative Examples 1 to 4 are summarized in Table 1 below.

TABLE 1

| | Antireflection Film Light Shielding Film Overlapping Region | | Light Shielding Film Non-Overlapping Region | | Light Shielding Film Thickness [nm] | | Film Blister/Peeling |
|---|---|---|---|---|---|---|---|
| | Total Film Thickness [nm] | Average Height of Irregularity Structure Portion [nm] | Total Film Thickness [nm] | Light Shielding Coating Material | 200-300 μm from Edge | 50 μm from Edge | after Environmental Test |
| Example 1 | 141.8 | 49.6 | 324 | Dye-Based | 1.2 | 4.5 | Not Observed |
| Example 2 | 97.2 | 34.7 | 251 | Dye-Based | 0.9 | 3.7 | Not Observed |
| Example 3 | 236.5 | 28.4 | 413 | Dye-Based | 1.2 | 4.3 | Not Observed |
| Example 4 | 154.3 | 40.2 | 352 | GT-7 | 1.5 | 5.4 | Not Observed |
| Example 5 | 149.5 | 35.5 | 337 | GT-7 II | 0.9 | 4.2 | Not Observed |
| Example 6 | 122.7 | 38.6 | 298 | GT-1000 | 1.3 | 5.1 | Not Observed |
| Example 7 | 135.3 | 44.1 | 330 | OK602 | 1.8 | 5.7 | Not Observed |
| Comparative Example 1 | 156.7 | 121.4 | 361 | Dye-Based | 1.3 | 4.7 | Observed |
| Comparative Example 2 | 244.1 | 207.3 | 450 | Dye-Based | 1.6 | 5.0 | Observed |
| Comparative Example 3 | 128.3 | 80.2 | 302 | Dye-Based | 1.0 | 4.1 | Observed |
| Comparative Example 4 | 290.5 | 251.9 | 483 | GT-7 II | 1.7 | 5.2 | Observed |

While the present disclosure has been described with reference to exemplary embodiments, it is to be understood that the disclosure is not limited to the disclosed exemplary embodiments. The scope of the following claims is to be accorded the broadest interpretation so as to encompass all such modifications and equivalent structures and functions.

This application claims the benefit of Japanese Patent Application No. 2017-034272, filed Feb. 27, 2017, which is hereby incorporated by reference herein in its entirety.

What is claimed is:

1. An optical element comprising:
    a base having, on at least one surface, both a first portion and a second portion surrounding an outer periphery of the first portion;
    an antireflection film continuously formed over the first portion and over a portion of the second portion, the antireflection film having an irregularity structure on a surface opposite the base; and
    a light shielding film continuously formed over at least the second portion and a portion of the first portion to cover an outer peripheral edge portion of the antireflection film,
    wherein the irregularity structure has an average height in a range from 10 nm to 50 nm in a region where the antireflection film and the light shielding film overlap each other over the first portion, and
    wherein the light shielding film over the second portion has a thickness in a range from 3 μm to 50 μm.

2. The optical element according to claim 1, wherein the film thickness of the light shielding film at a location 50 μm from an edge of the light shielding film over the first portion is 3 μm or more.

3. The optical element according to claim 1, wherein the antireflection film mainly contains alumina.

4. The optical element according to claim 1, wherein the second portion has an arithmetic mean roughness Ra in a range from 1 μm to 50 μm.

5. A method for manufacturing an optical element, the method comprising:
    preparing a base having, on at least one surface, both a first portion and a second portion surrounding an outer periphery of the first portion;
    continuously forming, over the first portion and over a portion of the second portion, an antireflection film having an irregularity structure on a surface of the antireflection film;

applying a light shielding coating material on at least the second portion and a portion of the first portion to cover an outer peripheral edge portion of the antireflection film, a thickness of the applied light shielding coating material being in a range from 3 μm to 50 μm; and bringing into contact an elastic member with the light shielding coating material applied on the antireflection film over the first portion to arrange for the irregularity structure to have an average height of 50 nm or less.

6. An optical apparatus comprising:

a holder configured to be brought into contact with a light shielding film of an optical element comprising:

a base having, on at least one surface, both a first portion and a second portion surrounding an outer periphery of the first portion;

an antireflection film continuously formed over the first portion and over a portion of the second portion of the base, the antireflection film having an irregularity structure on a surface opposite the base; and the light shielding film continuously formed over at least the second portion and a portion of the first portion to cover an outer peripheral edge portion of the antireflection film, wherein the irregularity structure has an average height in a range from 10 nm to 50 nm in a region where the antireflection film and the light shielding film overlap each other over the first portion, wherein the light shielding film over the second portion has a thickness in a range from 3 μm to 50 μm, and wherein the holder is configured to hold the optical element.

* * * * *